(12) United States Patent
Jung et al.

(10) Patent No.: US 12,675,297 B2
(45) Date of Patent: Jul. 7, 2026

(54) PRINTED CIRCUIT BOARD COMPRISING MEMORY, AND DATA PROCESSING METHOD THEREOF

(71) Applicant: Samsung Electronics Co., Ltd., Suwon-si (KR)

(72) Inventors: Jaehoon Jung, Suwon-si (KR); Byungjun Kim, Suwon-si (KR); Haksoo Kim, Suwon-si (KR); Heonjin Park, Suwon-si (KR); Taeheum Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 18/601,348

(22) Filed: Mar. 11, 2024

(65) Prior Publication Data

US 2024/0211271 A1 Jun. 27, 2024

Related U.S. Application Data

(63) Continuation of application No. PCT/KR2022/013449, filed on Sep. 7, 2022.

(30) Foreign Application Priority Data

Sep. 10, 2021 (KR) ........................ 10-2021-0121042

(51) Int. Cl.
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS 8,806,297 B2 8/2014 D'abreu et al.
9,032,193 B2 5/2015 Joshi et al.
(Continued)

FOREIGN PATENT DOCUMENTS

KR 20000020100 A 4/2000
KR 20100121215 A 11/2010
(Continued)

OTHER PUBLICATIONS

International Search Report for PCT/KR2022/013449 dated Dec. 23, 2022, 6 pages.
(Continued)

*Primary Examiner* — Paul Yen
(74) *Attorney, Agent, or Firm* — Nixon & Vanderhye P.C.

(57) ABSTRACT

A printed circuit board may include a plurality of printed board assemblies (PBAs) and an interface configured to connect the plurality of PBAs and an external device, wherein the interface includes terminals having an N*M array, and terminals having an N*K array among the terminals having the N*M array are electrically connected to each PBA included in the plurality of PBAs, wherein the each PBA includes a volatile memory, a nonvolatile memory, and at least one processor, and wherein each of the PBAs is configured to: in case that power is supplied from a first terminal among the terminals having the N*K array, transmit a first parameter signal to a second terminal among the terminals having the N*K array; in response to the transmission of the first parameter signal, store boot-loader data received from the external device in the volatile memory; in response to the storing of the boot-loader data, transmit a second parameter signal to a third terminal among the terminals having the N*K array; and in response to the transmission of the second parameter signal, store binary
(Continued)

data received from the external device in the nonvolatile memory.

20 Claims, 8 Drawing Sheets

(56)         References Cited

U.S. PATENT DOCUMENTS

| | | | |
|---|---|---|---|
| 9,836,417 | B2 | 12/2017 | Mccabe et al. |
| 10,936,413 | B2 | 3/2021 | Chih et al. |
| 2010/0287424 | A1 | 11/2010 | Kwon |
| 2012/0151128 | A1 | 6/2012 | Yang |
| 2015/0169333 | A1 | 6/2015 | Jung et al. |
| 2019/0179625 | A1 | 6/2019 | Rosner et al. |
| 2019/0188083 | A1 | 6/2019 | Cho |
| 2019/0205208 | A1 | 7/2019 | Chih et al. |
| 2022/0382624 | A1 | 12/2022 | Kim et al. |

FOREIGN PATENT DOCUMENTS

| | | | |
|---|---|---|---|
| KR | 20120065576 | A | 6/2012 |
| KR | 20190073768 | A | 6/2019 |
| KR | 20200066082 | A | 6/2020 |
| KR | 102178833 | B1 | 11/2020 |
| WO | 2021162367 | A1 | 8/2021 |

OTHER PUBLICATIONS

Written Opinion of the ISA for PCT/KR2022/013449 dated Dec. 23, 2022, 4 pages.
Korean Office Action dated Nov. 3, 2025 for KR Application No. 10-2021-0121042.
Korean Notice of Patent Grant dated May 12, 2026 for KR Application No. 10-2021-0121042.

Printed Circuit Board (100)

Plurality of PBAs (120)

220

Each PBA

Volatile
Memory

210

230

110

Processor

Nonvolatile
Memory

Interface

PRINTED CIRCUIT BOARD COMPRISING MEMORY, AND DATA PROCESSING METHOD THEREOF

CROSS-REFERENCE TO RELATED APPLICATIONS

This application is a continuation of International Application No. PCT/KR2022/013449 filed on Sep. 7, 2022, designating the United States, and claiming priority to Korean Patent Application No. 10-2021-0121042 filed on Sep. 10, 2021, in the Korean Intellectual Property Office, the disclosures of all of which are hereby incorporated by reference herein in their entireties.

BACKGROUND

Field

Various example embodiments relate to a printed circuit board including a memory and/or a data processing method thereof.

Description of Related Art

In order to implement a program after power is input into an electronic device, a booting process of an operating system is preceded before execution of the program. In order to perform the booting process of the operating system, boot-loader data should be stored in a memory device.

In order to dispose a memory device including boot-loader data in an electronic device, a printed circuit board including the memory device may be disposed in the electronic device. Specifically, the memory device including boot-loader data may be mounted in the electronic device by a method of disposing a nonvolatile memory device on the printed circuit board after the boot-loader data is stored in the nonvolatile memory.

In order to dispose a memory device in which boot-loader data and binary data are stored in a printed circuit board, a reflow process using a binder material and high-temperature heat should be performed. In this process, data stored in the memory device may be damaged by high-temperature heat accompanied when the memory device is mounted on the printed circuit board.

When data stored in the memory device is damaged by high-temperature heat, a memory device mounted on the printed circuit board should be replaced. In order to replace the memory device mounted on the printed circuit board, the memory device should be separated from the printed circuit board by heating the memory device again. As a result, the memory device may be secondarily damaged, and the damaged memory device may be required to be discarded.

Therefore, in case that data in a memory device mounted on a printed circuit board is damaged in a reflow process, costs for replacing or discarding the memory device are incurred to deteriorate the productivity.

SUMMARY

According to various example embodiments, a printed circuit board may include a plurality of printed board assemblies (PBAs) and an interface, comprising interface circuitry, configured to connect the plurality of PBAs and an external device, wherein the interface may include terminals having an N*M array, and terminals having an N*K array among the terminals having the N*M array may be electrically connected, directly or indirectly, to each PBA included in the plurality of PBAs, wherein the each PBA may include a volatile memory, a nonvolatile memory, and a processor, and wherein the each PBA may be configured to: in case that power is supplied from a first terminal among the terminals having the N*K array, transmit a first parameter signal to a second terminal among the terminals having the N*K array; in response to the transmission of the first parameter signal, store boot-loader data received from the external device in the volatile memory; in response to the storing of the boot-loader data, transmit a second parameter signal to a third terminal among the terminals having the N*K array; and in response to the transmission of the second parameter signal, store binary data received from the external device in the nonvolatile memory.

According to various example embodiments, a data processing method with respect to a volatile memory and a nonvolatile memory disposed in each PBA included in a plurality of PBAs in a printed circuit board including the plurality of PBAs and an interface configured to connect an external device with the plurality of PBAs, may include: in case that power is supplied from a first terminal of the interface, transmitting a first parameter signal to at least one second terminal of the interface; storing boot-loader data received from the external device in the volatile memory in response to the transmission of the first parameter signal; transmitting a second parameter signal to a third terminal of the interface in response to the storing of the boot-loader data; and storing binary data received from the external device in the nonvolatile memory in response to the transmission of the second parameter signal, wherein the interface may include terminals having an N*M array, and the terminals having an N*K array among the terminals having the N*M array may be electrically connected to the each PBA included in the plurality of PBAs.

According to various example embodiments, a printed circuit board including a plurality of PBAs may include: an interface configured to connect the plurality of PBAs and an external device; and a volatile memory, a nonvolatile memory, and a processor included in each PBA included in the plurality of PBAs, wherein the each PBA may be configured to: transmit a first parameter signal to at least one second terminal of the interface to which power is supplied from a first terminal of the interface; store boot-loader data received from the external device in the volatile memory in response to the transmission of the first parameter signal; transmit a second parameter signal to a third terminal of the interface in response to the storing of the boot-loader data; and store binary data received from the external device in the nonvolatile memory in response to the transmission of the second parameter signal.

Various example embodiments may prevent or reduce the chance of data stored in a memory device from being damaged by high-temperature heat.

Various example embodiments may prevent or reduce the need for replacement of a memory device mounted on a printed circuit board and/or incurrence of costs and/or time consumption due to the replacement, and thus may increase the productivity.

In addition, various effects directly or indirectly understood through the disclosure can be provided.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Hereinafter, various example embodiments are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1A:
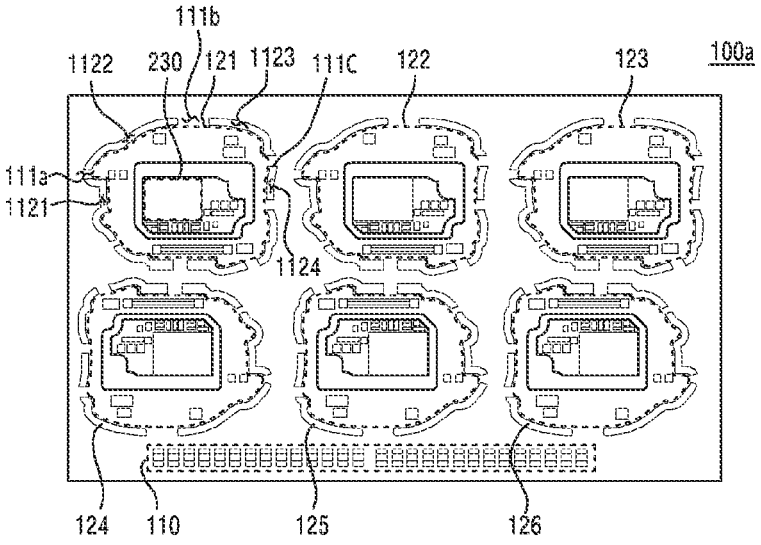
FIGS. 1A and 1B illustrate a printed circuit board including a plurality of PBAs according to various example embodiments.
Figure 1B:
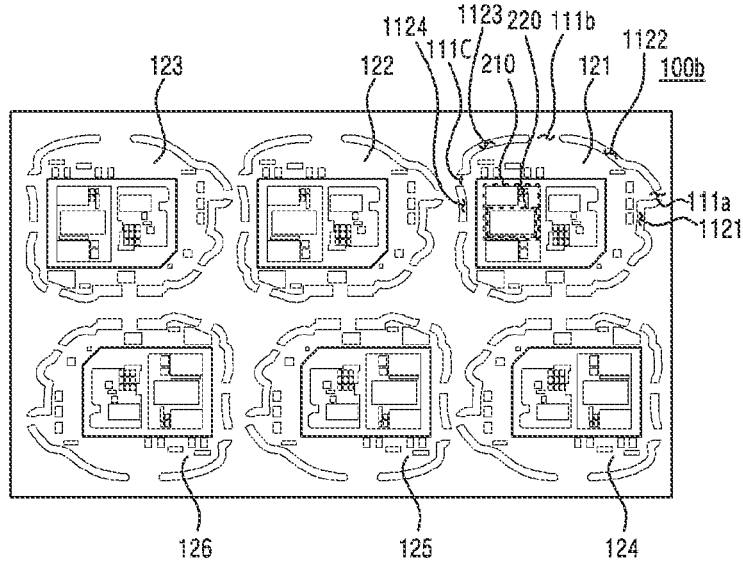

FIGS. 1A and 1B illustrate a printed circuit board 100 including a plurality of PBAs 120 according to various embodiments.

In an embodiment, the printed circuit board 100 may include a first surface 100a and a second surface 100b opposite to the first surface 100a.

In an embodiment, the printed circuit board 100 may include a plurality of PBAs 120 and an interface 110.

In an embodiment, the plurality of PBAs 120 may include a first PBA 121, a second PBA 122, a third PBA 123, a fourth PBA 124, a fifth PBA 125, and a sixth PBA 126. It is illustrated that the plurality of PBAs 120 include six PBAs, but it is not limited thereto.

In an embodiment, each of the first PBA 121 to the sixth PBA 126 included in the plurality of PBAs 120 may be merely referred to as a PBA.

In an embodiment, the plurality of PBAs 120 may be connected to the printed circuit board 100 through a plurality of bridges 111.

Referring to FIG. 1A, the interface 110 may be disposed on, directly or indirectly, the first surface 100A of the printed circuit board 100. In an embodiment, each PBA disposed on, directly or indirectly, the first surface 100a of the printed circuit board 100 may include a nonvolatile memory 230.

Referring to FIG. 1B, a processor 210 and a volatile memory 220 corresponding to each PBA may be disposed on, directly or indirectly, the second surface 100b of the printed circuit board 100.

In the illustrated embodiment, the processor 210 is disposed on, directly or indirectly, the second surface 100b of the printed circuit board 100. However, the processor 210 may be disposed on, directly or indirectly, one of the first surface 100a or the second surface 100b of the printed circuit board 100 according to a disposition design with respect to various devices mounted to each PBA.

In an embodiment, the printed circuit board 100 may include a plurality of slits for separating the plurality of PBAs 120 from the printed circuit board 100. In an embodiment, the printed circuit board 100 may include at least one of a first slit 1121, a second slit 1122, a third slit 1123, and a fourth slit 1124 for separating each PBA from the printed circuit board 100.

In an embodiment, the printed circuit board 100 may include a plurality of bridges 111. In an embodiment, the plurality of PBAs 120 may be connected to the printed circuit board 100 through the plurality of bridges 111. In an embodiment, each PBA may be connected to the printed circuit board 100 through the plurality of bridges 111. In an embodiment, the plurality of bridges 111 may include at least one of a first bridge 111a, a second bridge 111b, and a third bridge 111c. In an embodiment, the first bridge 111a may be disposed between the first slit 1121 and the second slit 1122. The second bridge 111b may be disposed between the second slit 1122 and the third slit 1123. The third bridge 111c may be disposed between the third slit 1123 and the fourth slit 1124.

In an embodiment, the plurality of bridges 111 may include at least one of a bridge including a conductive pattern and a bridge including no conductive pattern. In an embodiment, the bridge including the conductive pattern among the plurality of bridges 111 may be connected to at least one interface 110.

In an embodiment, the printed circuit board 100 may include a mounting area in which the plurality of PBAs 120 are disposed and a non-mounting area excluding the mounting area. The interface 110 may be disposed in the non-mounting area.

In an embodiment, the printed circuit board 100 may include at least one interface 110. In an embodiment, the interface 110 may be disposed on, directly or indirectly, the lower part of the first surface 110a of the printed circuit board 100.

Figure 3:
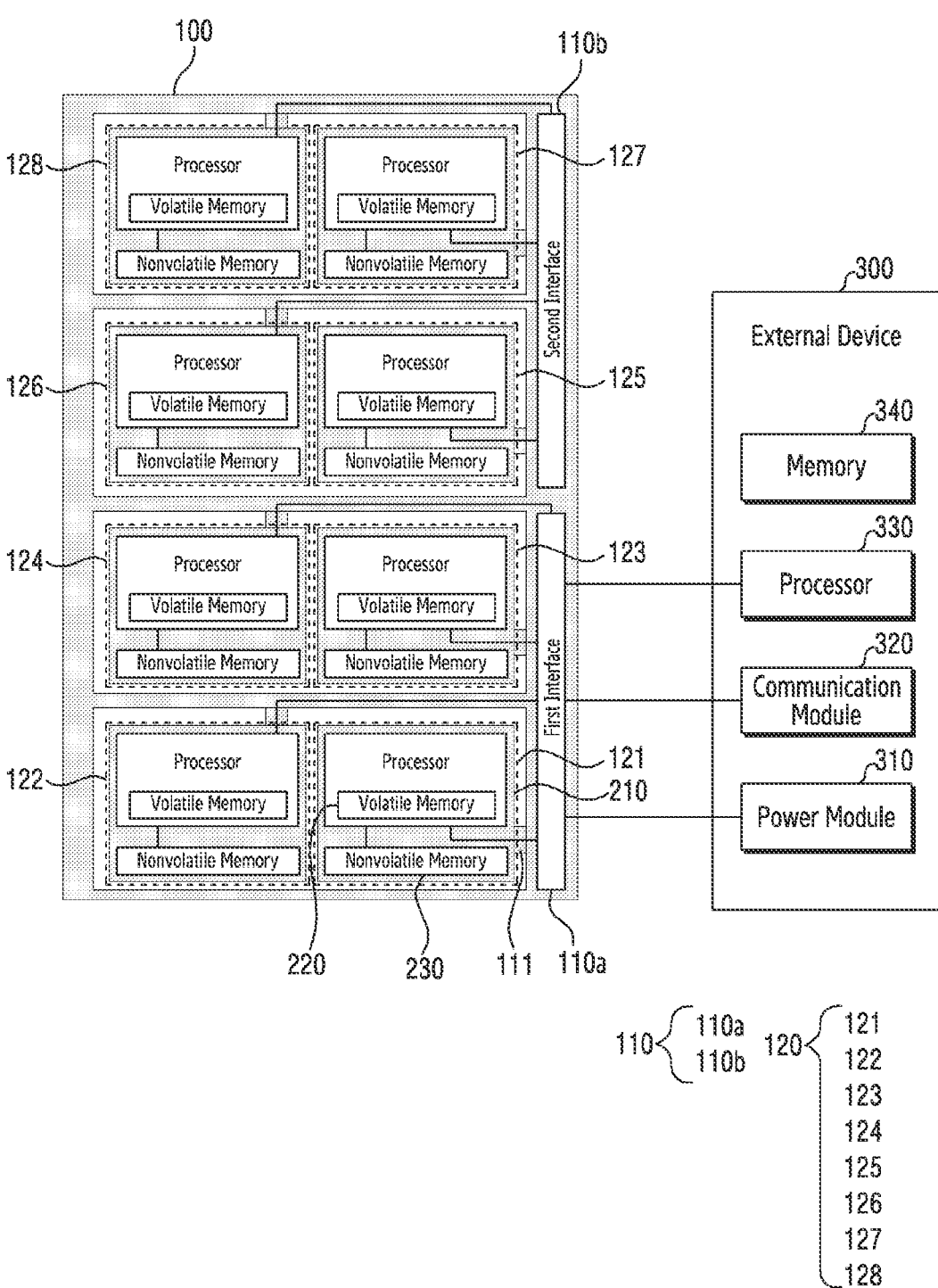
FIG. 3 illustrates a connection relationship between an external device and a printed circuit board including a plurality of PBAs according to various example embodiments.

In an embodiment, the interface 110 may connect the plurality of PBAs 120 and an external device (e.g., an external device 300 of FIG. 3). In an embodiment, the interface 110 may control the input and output of a signal.

In an embodiment, the interface 110 may include an interface having a matrix type.

In an embodiment, the interface 110 may include a plurality of terminals (pins). In an embodiment, the interface 110 may include a plurality of terminals having an N*M array (each where N and M are integers larger than or equal to 1).

In an embodiment, the processor 210 and the volatile memory 220 may be disposed on the second surface 100b of the printed circuit board 100. In an embodiment, when the second surface 100b of the printed circuit board 100 is viewed from above, the volatile memory 220 may be disposed on the upper surface of the processor 210. In the illustrated embodiment, the processor 210 and the volatile memory 220 are disposed to be physically separated from each other. However, the volatile memory 220 may be included in the processor 210.

In an embodiment, the volatile memory 220 and the nonvolatile memory 230 included in each PBA may be a blank memory in which data is not stored.

In an embodiment, the plurality of PBAs 120 disposed on the printed circuit board 100 may be separated from the printed circuit board 100 according to a cutting process.

In an embodiment, each PBA included in the plurality of PBAs 120 may include a main PBA (not illustrated) and an auxiliary PBA (not illustrated). In an embodiment, the main PBA and the auxiliary PBA of each PBA may have a stacked structure. The main PBA and the auxiliary PBA may have the stacked structure through the interposer. In an embodiment, the interface 110 and the nonvolatile memory 230 may be disposed in the main PBA. The processor 210 and the volatile memory 220 may be disposed in the auxiliary PBA.

Figure 2:
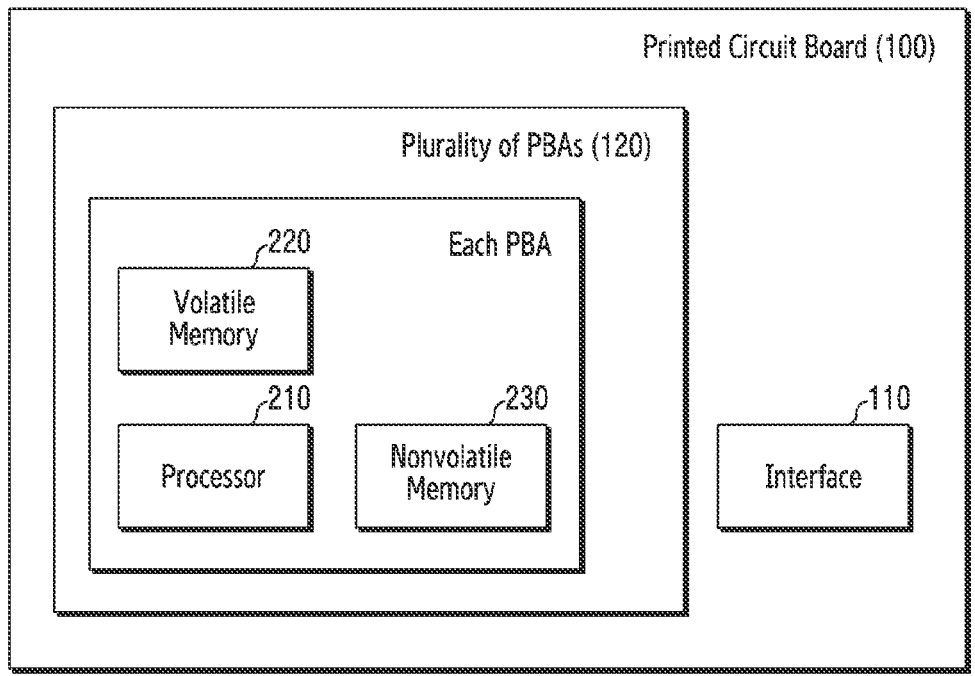
FIG. 2 is a block diagram of a printed circuit board including a plurality of PBAs according to various example embodiments.

FIG. 2 is a block diagram of the printed circuit board 100 including the plurality of PBAs 120 according to various embodiments.

In an embodiment, the printed circuit board 100 may include an interface 110 and a plurality of PBAs 120.

In an embodiment, each PBA included in the plurality of PBAs 120 may include a processor 210, a volatile memory 220, and a nonvolatile memory 230.

In an embodiment, the interface 110 may connect the plurality of PBAs 120 and an external device (e.g., the external device 300 of FIG. 3).

In an embodiment, the interface 110 may include a plurality of terminals (pins). In an embodiment, the interface 110 may control the plurality of PBAs 120 according to input and output signals through the plurality of terminals.

In an embodiment, the interface 110 may include a plurality of terminals having an N*M array. Each of N and M may be an integer larger than 1. In an embodiment, the plurality of terminals having an N*K array among the plurality of terminals having the N*M array may be electrically connected to each PBA included in the plurality of PBAs 120. K may be an integer smaller than M.

In an embodiment, the interface 110 may receive data from the external device through at least one of the plurality of terminals.

In an embodiment, the interface 110 may store date received from the external device in the volatile memory 220 or the nonvolatile memory 230 according to input and output signals received through the plurality of terminals.

In an embodiment, in case of receiving a first signal through at least one terminal among the plurality of terminals, the interface 110 may store boot-loader data, which is received from an external device, in the volatile memory 220.

In an embodiment, in case of receiving a second signal through at least one terminal among the plurality of terminals, the interface 110 may store binary data, which is received from an external device, in the nonvolatile memory 230.

In an embodiment, the interface 110 may store data required for controlling the nonvolatile memory 230 in the volatile memory 220.

Figure 4:
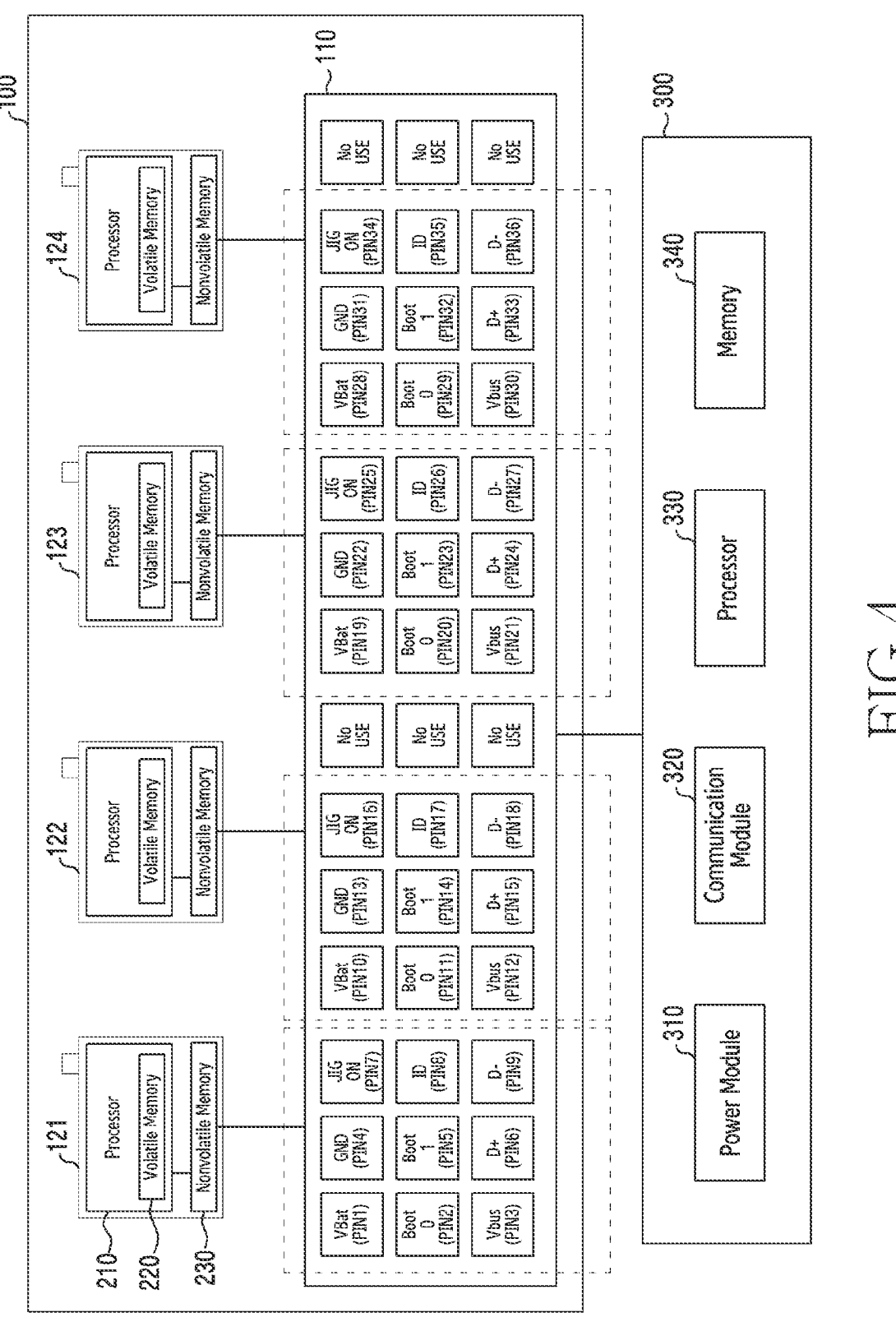
FIG. 4 illustrates an interface configured to connect an external device and a plurality of PBAs included in a printed circuit board according to various example embodiments.

In an embodiment, a function with respect to each of the plurality of terminals included in the interface 110 connecting the plurality of PBAs 120 and the external device 300 is described in detail by referring to FIG. 4.

In an embodiment, data stored in the volatile memory 220 may be removed from the volatile memory 220 when power supply with respect to the volatile memory 220 is blocked.

In an embodiment, the volatile memory 220 may include at least one of a random access memory (RAM), a dynamic RAM (DRAM), a static RAM (SRAM), a Synchronous DRAM (SDRAM), a Phase-change RAM (PRAM), a Magnetic RAM (MRAM), a Resistive RAM (RRAM), and a Ferroelectric RAM (FeRAM).

In an embodiment, data stored in the nonvolatile memory 230 may be maintained in the nonvolatile memory 230 even if power supply with respect to the nonvolatile memory 230 is blocked.

In an embodiment, the nonvolatile memory 230 may include a Read Only Memory (ROM), a NAND flash memory, a Programmable ROM (PROM), an Electrically Programmable ROM (EPROM), an Electrically Erasable and Programmable ROM (EEPROM), a Phase-change RAM (PRAM), a Magnetic RAM (MRAM), a Resistive RAM (RRAM), and a Ferroelectric RAM (FRAM).

In an embodiment, the processor 210 may be electrically connected to the volatile memory 220, the nonvolatile memory 230, and the interface 110.

In an embodiment, the processor 210 may include an application processor (AP).

FIG. 3 illustrates a connection relationship between the external device 300 and the printed circuit board 100 including the plurality of PBAs 120 according to various embodiments.

In an embodiment, the printed circuit board 100 may include a plurality of PBAs 120 and an interface 110.

In an embodiment, the printed circuit board 100 may be electrically connected to the external device 300 through the interface 110. In an embodiment, the plurality of PBAs 120 included in the printed circuit board 100 may be connected to the external device 300 through the interface 110.

In an embodiment, the printed circuit board 100 may include at least one interface 110.

In an embodiment, the interface 110 may include a first interface 110a and a second interface 110b. In an embodiment, one of the first interface 110a and the second interface 110b may control a maximum of 4 PBAs for example.

In an embodiment, the first interface 110a may connect at least one of the first PBA 121, the second PBA 122, the third PBA 123, and the fourth PBA 124 to the external device 300. The second interface 110b may connect at least one of the fifth PBA 125, the sixth PBA 126, a seventh PBA 127 and an eighth PBA 128 to the external device 300.

In an embodiment, the interface 110 may be electrically connected to the external device 300 through a connection device (not illustrated). In the illustrated embodiment, the first interface 110a is electrically connected to the external device 300 through the connection device. However, the second interface 110b may be also electrically connected to the external device 300 through the connection device.

In an embodiment, the connection device (not illustrated) may include various interfaces such as an interface according to a first standard (e.g., USB 2.0 port) and/or an interface according to a second standard (e.g., USB 3.0 port).

In an embodiment, the external device 300 may include a power module 310 comprising circuitry, a communication module 320 comprising communication circuitry, a processor 330 comprising processing circuitry, and a memory 340.

In an embodiment, the power module 310 included in the external device 300 may supply power to the printed circuit board 100. In an embodiment, the power module 310 of the external device 300 may supply power to the printed circuit board 100 through the interface 110 of the printed circuit board 100.

In an embodiment, the power module 310 of the external device 300 may supply power to the printed circuit board 100 through a power terminal (e.g., a first terminal (pin 1)

of FIG. 4) among the plurality of terminals included in the interface 110, and then measure a current.

In an embodiment, the printed circuit board 100 may receive power from the power module 310 of the external device 300 through the power terminal among the plurality of terminals included in the interface 110.

In an embodiment, the external device 300 may communicate with the printed circuit board 100 through the communication module 320.

In an embodiment, the printed circuit board 100 may communicate with the external device 300 through the interface 110. In an embodiment, the printed circuit board 100 may transmit or receive data or a signal to or from the external device 300 through a communication terminal (e.g., the third terminal (pin 3), the sixth terminal (pin 6) and the ninth terminal (pin 9) of FIG. 4) among the plurality of terminals included in the interface 110.

In an embodiment, the processor 330 included in the external device 300 may transmit a signal to the interface 110 of the printed circuit board 100. In an embodiment, the processor 330 included in the external device 300 may transmit a designated signal to the terminal corresponding to the designated signal among the plurality of terminals included in the interface 110.

In an embodiment, the memory 340 included in the external device 300 may include boot-loader data and binary data.

In an embodiment, the boot-loader data included in the memory 340 of the external device 300 may include data required for a booting process when power is supplied to a system. The boot-loader data may include data required for driving of an operating system. In an embodiment, the boot-loader data may include data related to the operating system. For example, the operating system may include at least one of a Unix-based file system, a Linux-based file system, a file system of a Microsoft Windows, and a Mac OS file system.

In an embodiment, the binary data included in the memory 340 of the external device 300 may include at least one of data required for driving of the operating system and stored in the nonvolatile memory 230 and data related to a firmware and a basic application related to the operating system. In an embodiment, the binary data may include boot-loader data.

FIG. 4 illustrates the interface 110 configured to connect the external device 300 and the plurality of PBAs 120 included in the printed circuit board 100 according to various embodiments.

In an embodiment, the interface 110 of the printed circuit board 100 may include a plurality of terminals. In an embodiment, the interface 110 may include terminals having an N*M array. The terminals having an N*K array among the terminals of the N*M array may be electrically connected to each PBA.

Referring to FIG. 4, the interface 110 may include terminals having a 3*14 array, and terminals having a 3*3 array among the terminals having the 3*14 array may be electrically connected to each PBA.

In an embodiment, the first terminal (pin 1) to the ninth terminal (pin 9) in the interface 110 including the terminals having the 3*14 array may control the first PBA 121. A tenth terminal (pin 10) to an eighteenth terminal (pin 18) included in the interface 110 may control the second PBA 122. A nineteenth terminal (pin 19) to a twenty-seventh terminal (pin 27) included in the interface 110 may control the third PBA 123. A twenty-eighth terminal (pin 28) to a thirty-sixth terminal (pin 36) included in the interface 110 may control the fourth PBA 124.

Hereinafter, a method in which the terminals having the 3*3 array of the interface 110 control each PBA is described by a method in which the first terminal (pin 1) to the ninth terminal (pin 9) included in the interface 110 control the first PBA 121, as an example. Each of the remaining PBAs may be controlled identically to the first PBA 121 through the terminals having the 3*3 array corresponding thereto. For example, the tenth terminal (pin 10) among the tenth terminal (pin 10) to the eighteenth terminal (pin 18) controlling the second PBA 122 may correspond to the first terminal (pin 1) among the first terminal (pin 1) to the ninth terminal (pin 9) controlling the first PBA 121.

In an embodiment, the first PBA 121 may receive power supplied from the external device 300 through the interface 110. In an embodiment, the external device 300 may supply power to the first PBA 121 through the power module 310. In an embodiment, the first PBA 121 may receive power supplied through a voltage input by a driving voltage terminal (Vbat) through the first terminal (pin 1) of the interface 110 from the external device 300. In an embodiment, a DC voltage may be applied to the driving voltage terminal (Vbat).

In an embodiment, when a voltage is applied to a voltage bus (Vbus) through the third terminal (pin 3) of the interface 110, a differential signal may be input through the sixth terminal (pin 6) connected to a USB D+ line and the ninth terminal (pin 9) connected to a USB D– line. In an embodiment, the printed circuit board 100 may communicate with the external device 300 through the sixth terminal (pin 6) and the ninth terminal (pin 9).

In an embodiment, the third terminal (pin 3), the sixth terminal (pin 6), and the ninth terminal (pin 9) of the interface 110 may be a communication terminal for performing a communication function with the external device 300.

In an embodiment, the interface 110 may receive at least one of boot-loader data and binary data from the external device 300 through the third terminal (pin 3), the sixth terminal (pin 6), and the ninth terminal (pin 9).

In an embodiment, the first PBA 121 may receive a parameter signal from the external device 300 through the interface 110. In an embodiment, the external device 300 may transmit the parameter signal to the first PBA 121 through the processor 330.

In an embodiment, the first PBA 121 may transmit the first parameter signal through the second terminal (pin 2) connected to Boot 0 of the interface 110 and the fifth terminal (pin 5) connected to Boot 1. In an embodiment, a first parameter signal transmitted through the second terminal (pin 2) and the fifth terminal (pin 5) may include an entry signal for storing boot-loader data in the volatile memory 220. In an embodiment, the first parameter signal may correspond to a combination of a "0" signal indicated by the second terminal (pin 2) and a "1" signal indicated by the fifth terminal (pin 5).

In an embodiment, the eighth terminal (pin 8) of the interface 110 may include an identification resistance value (ID) (unit: KΩ). In an embodiment, the identification resistance value may correspond to an identification value with respect to the external device 300. In an embodiment, a resistance value stored in the eighth terminal (pin 8) may include a first resistance value (e.g., 56 KΩ), a second resistance value (e.g., 301 KΩ), a third resistance value (e.g., 523 KΩ) and a fourth resistance value (e.g., 619 KΩ). In an embodiment, different functions may be performed according to a connected resistance value among the resistance values included in the eighth terminal (pin 8).

In an embodiment, the first PBA 121 may transmit the second parameter signal to the eighth terminal (pin 8) of the interface 110. The second parameter signal may include an entry signal for storing binary data in the nonvolatile memory 230. In an embodiment, the second parameter signal received from the external device 300 may include a signal for connection to the second resistance value included in the eighth terminal (pin 8) of the interface 110. When connected to the second resistance value included in the eighth terminal (pin 8) of the interface 110 by the second parameter signal received from the external device 300, the interface 110 may store binary data in the nonvolatile memory 230.

In an embodiment, the interface 110 may include a fourth terminal (pin 4) connected to a ground (GND).

Figure 5:
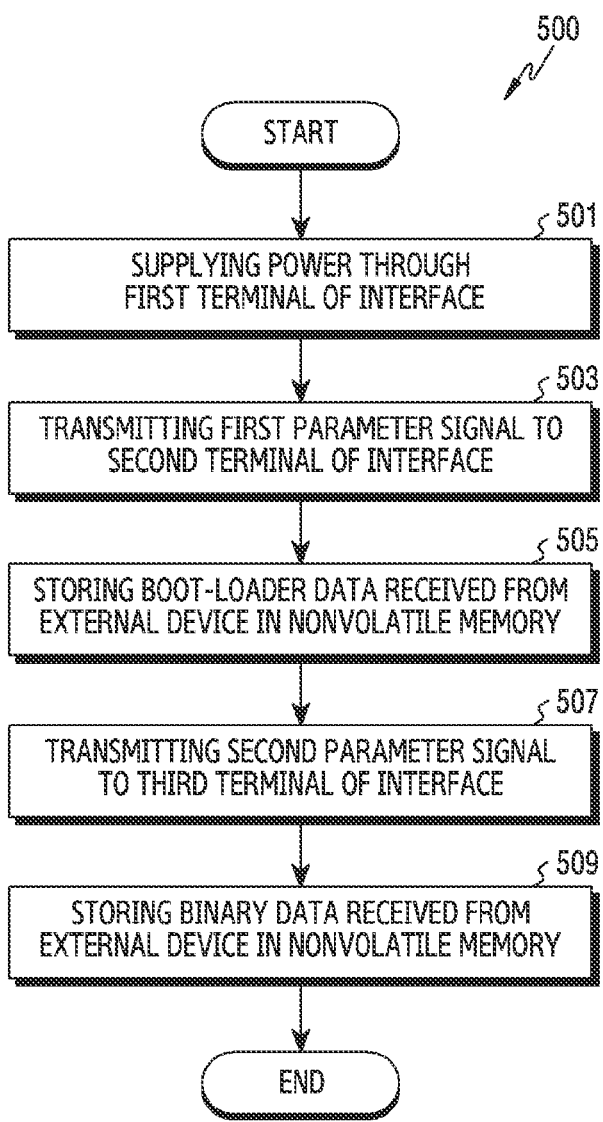
FIG. 5 is a flowchart illustrating a method of storing data in a memory disposed in each of a plurality of PBAs according to various example embodiments.

FIG. 5 is a flowchart 500 illustrating a method of storing data in a memory disposed in each of the plurality of PBAs 120 according to various embodiments.

According to an embodiment, in operation 501, each PBA may receive power supplied through the first terminal (e.g., the first terminal (pin 1) of FIG. 4) of the interface 110 in the printed circuit board 100 including the plurality of PBAs 120.

In an embodiment, the power module 310 of an external device (e.g., the external device 300 of FIG. 3) may supply power to the first terminal (e.g., the first terminal (pin 1) of FIG. 4) of the interface 110 included in the printed circuit board 100.

In an embodiment, each PBA may activate a communication terminal (e.g., the third terminal (pin 3), the sixth terminal (pin 6), and the ninth terminal (pin 9) of FIG. 4) of the interface 110, in response to the reception of the power supplied through the first terminal (pin 1).

In an embodiment, in response to the activation of the communication terminal (e.g., the third terminal (pin 3), the sixth terminal (pin 6), and the ninth terminal (pin 9) of FIG. 4) of the interface 110, each PBA may receive a signal for connection between the printed circuit board 100 and a modem port of the external device 300 from the external device 300.

According to an embodiment, in operation 503, each PBA may transmit the first parameter signal to the second terminal (e.g., the second terminal (pin 2) and the fifth terminal (pin 5) of FIG. 4) of the interface 110 in the printed circuit board 100 including the plurality of PBAs 120.

In an embodiment, the first parameter signal may include an entry signal for storing boot-loader data in the volatile memory 220.

In an embodiment, the first parameter signal may include a combination of a signal input to the second terminal (e.g., the second terminal (pin 2) of FIG. 4) and the fifth terminal (e.g., the fifth terminal (pin 5) of FIG. 4) (e.g., a combination of 0 and 1). The combination of the signal input to the second terminal and the fifth terminal may include various combinations according to a type of the processor 210.

According to an embodiment, in operation 505, each PBA may store boot-loader data received from the external device 300 in the volatile memory 220 in the printed circuit board 100 including the plurality of PBAs 120.

In an embodiment, each PBA may store boot-loader data received from the external device 300 in the volatile memory 220 in case that the first parameter signal is transmitted through the second terminal (e.g., the second terminal (pin 2) and the fifth terminal (pin 5) of FIG. 4) of the interface 110.

In an embodiment, the volatile memory 220 may include a random access memory (RAM).

In an embodiment, in case that the first parameter signal is transmitted through the second terminal of the interface 110, the external device 300 may transmit boot-loader data to a communication terminal (e.g., the third terminal (pin 3), the sixth terminal (pin 6), and the ninth terminal (pin 9) of FIG. 4) of the interface 110 through the communication module 320.

In an embodiment, in case that boot-loader data is received from the external device 300 according to transmission of the first parameter signal to the second terminal of the interface 110, each PBA may store the boot-loader data received from the external device 300 in the volatile memory 220.

In an embodiment, each PBA may temporally store boot-loader data received from the external device 300 in the volatile memory 220.

In an embodiment, in case that boot-loader data received from the external device 300 is stored in the volatile memory 220, the processor 210 may determine whether the boot-loader data is normally stored in the volatile memory 220. In an embodiment, in case that the boot-loader data is not normally stored in the volatile memory 220, power may not be supplied to the processor 210. In an embodiment, in case that the boot-loader data is not normally stored in the volatile memory 220, a problem may occur in the function of the processor 210 for normally writing or reading data.

In an embodiment, the processor 210 may transmit a signal to the interface 110 in case that it is determined that boot-loader data is normally stored in the volatile memory 220.

In an embodiment, in order to store data in the nonvolatile memory 230, boot-loader data should be loaded to the processor 210. Therefore, each PBA may temporally store the boot-loader data in the volatile memory 220.

In an embodiment, in response to the storing of the boot-loader data in the volatile memory 220, each PBA may receive a string signal and a signal for connection between the printed circuit board 100 and a modem port of the external device 300 from the external device 300. In an embodiment, the processor 210 may receive a string signal from the external device 300. In an embodiment, when the external device 300 transmits an "ODIN" string signal to each PBA, the processor 210 included in each PBA may receive an "LOKE" string signal with respect to the "ODIN" string signal transmitted from the external device 300.

According to an embodiment, in operation 507, in response to the reception of the sting signal and the connection signal from the external device 300 by the processor 210, each PBA may transmit the second parameter signal to the third terminal (e.g., the eighth terminal (pin 8) of FIG. 4) of the interface 110 in the printed circuit board 100 including the plurality of PBAs 120.

In an embodiment, the second parameter signal may include an entry signal for storing binary data in the nonvolatile memory 230. The binary data may include boot-loader data. The binary data may include the same data as the boot-loader data stored in the volatile memory 220.

In an embodiment, the second parameter signal may include a signal for connection to a second resistance value (e.g., 301 KΩ) included in the third terminal (e.g., the eighth terminal (pin 8) of FIG. 4).

According to an embodiment, in operation 509, each PBA may store binary data received from the external device 300 in the nonvolatile memory 230 in the printed circuit board 100 including the plurality of PBAs 120.

In an embodiment, in case that the second parameter signal for connection to the second resistance value included in the third terminal is transmitted to the third terminal (e.g., the eighth terminal (pin 8) of FIG. 4) of the interface 110, each PBA may store binary data received from the external device 300 in the nonvolatile memory 230.

In an embodiment, the nonvolatile memory 230 may include at least one of a read only memory (ROM) and a NAND flash memory.

In an embodiment, in case that the second parameter signal is transmitted to the third terminal of the interface 110, the external device 300 may transmit binary data to a communication terminal (e.g., the third terminal (pin 3), the sixth terminal (pin 6), and the ninth terminal (pin 9) of FIG. 4) of the interface 110 through the communication module 320.

In an embodiment, in case of receiving binary data from the external device 300 according to the transmission of the second parameter signal to the third terminal of the interface 110, each PBA may store the binary data in the nonvolatile memory 230.

In an embodiment, in response to the storing of the binary data in the nonvolatile memory 230, the processor 210 may store a file system and a basic application in the nonvolatile memory 230 through the stored binary data.

In an embodiment, in case that the boot-loader data received from the external device 300 is temporally stored in the volatile memory 220 and then the second parameter signal is transmitted to the third terminal of the interface 110, each PBA may store the binary data including the boot-loader data in the nonvolatile memory 230.

In an embodiment, in case that the binary data received from the external device 300 is stored in the nonvolatile memory 230, the processor 210 may determine whether the binary data is normally stored in the nonvolatile memory 230.

Figure 6:
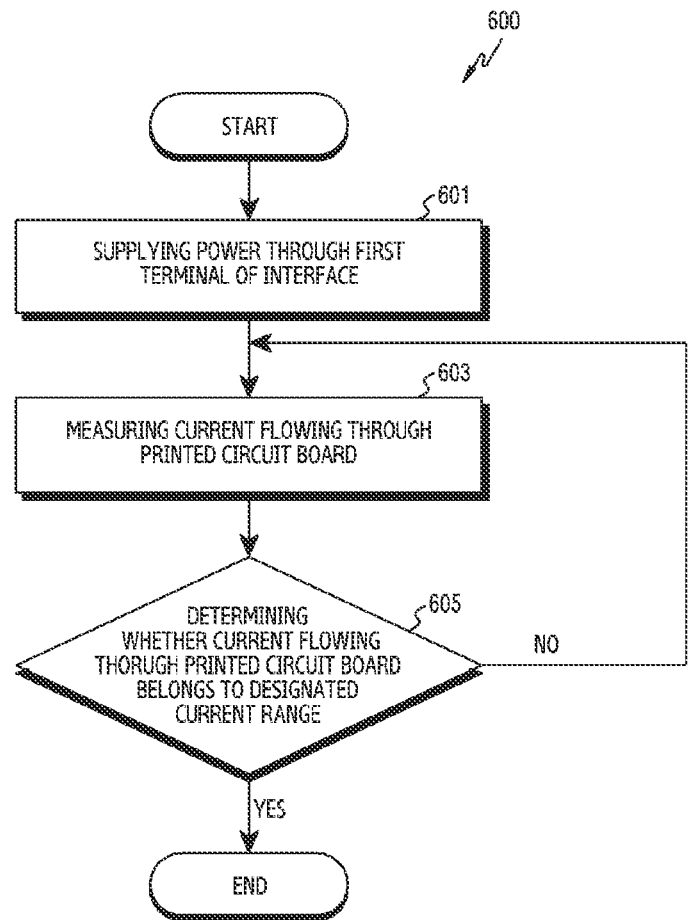
FIG. 6 is a flowchart illustrating a method of determining whether a volatile memory and a nonvolatile memory included in each PBA have been normally mounted in a printed circuit board including the plurality of PBAs according to various example embodiments.

FIG. 6 is a flowchart 600 illustrating a method of determining whether the volatile memory 220 and the nonvolatile memory 230 included in each PBA have been normally mounted in the printed circuit board 100 including the plurality of PBAs 120 according to various embodiments.

In an embodiment, the processor 210 may transmit a signal to the interface 110 in case that it is determined that the boot-loader data is normally stored in the volatile memory 220.

According to an embodiment, in operation 601, each PBA may receive power through the first terminal (e.g., the first terminal (pin 1) of FIG. 4) of the interface 110 in the printed circuit board 100 including the plurality of PBAs 120.

In an embodiment, the power module 310 included in the external device 300 may supply power to the first terminal of the interface 110.

According to an embodiment, in operation 603, the power module 310 included in the external device 300 may measure a current flowing through the printed circuit board 100 after supplying power through the first terminal of the interface 110.

According to an embodiment, in operation 605, the power module 310 included in the external device 300 may determine whether the current measured in operation 603 belongs to a designated current range.

In an embodiment, in case that the current flowing through the printed circuit board 100, which is measured by the power module 310 included in the external device 300, belongs to a designated current range (e.g., about 0~2 A), the power module 310 of the external device 300 may determine that the processor 210, the volatile memory 220 and the nonvolatile memory 230 disposed (or included) in each PBA are normally disposed.

In an embodiment, in case that the current flowing through the printed circuit board 100, which is measured by the power module 310 included in the external device 300, does not belong to the designated range, the power module 310 of the external device 300 may determine that the processor 210, the volatile memory 220 and the nonvolatile memory 230 disposed (or included) in each PBA are abnormally disposed. In an embodiment, in case that at least one of the processor 210, the volatile memory 220 and the nonvolatile memory 230 is not normally disposed in each PBA of the printed circuit board 100 or the terminal receiving power from the interface 110 is defective, the current flowing through the printed circuit board 100 may not belong to the designated range.

In an embodiment, in case that the current flowing through the printed circuit board 100 measured through the power module 310 included in the external device 300 belongs to the designated range, the power module 310 of the external device 300 may transmit the first signal to the interface 110 of the printed circuit board 100.

In an embodiment, the printed circuit board 100 including the plurality of PBAs 120 may transmit the first parameter signal to the second terminal (e.g., the second terminal (pin 2) and the fifth terminal (pin 5) of FIG. 4) of the interface 110 in case of receiving the first signal from the external device 300 through the interface 110.

Figure 7:
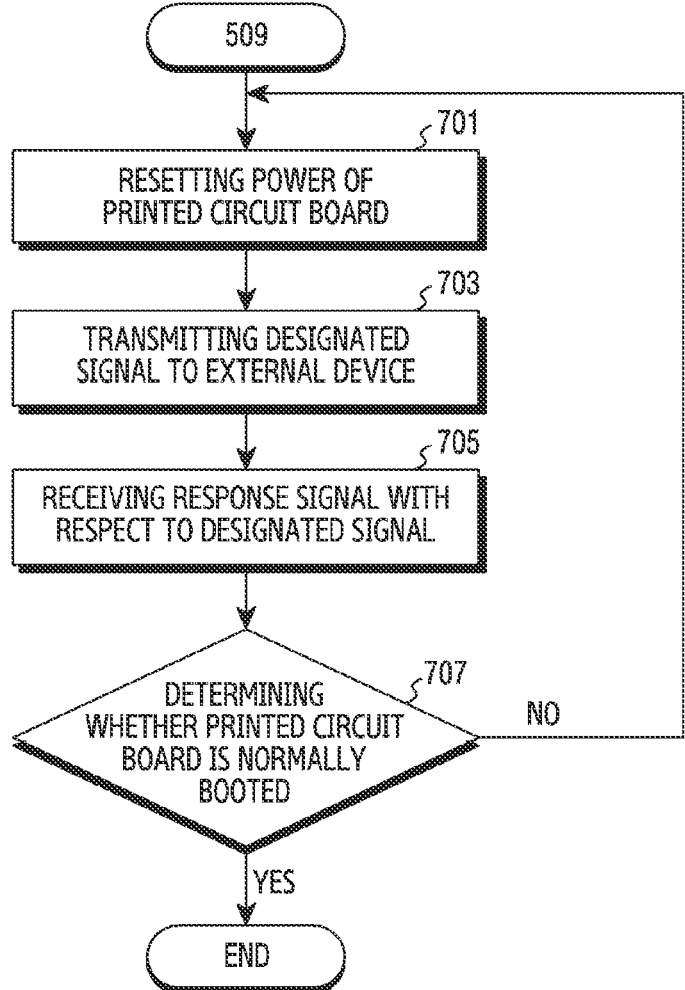
FIG. 7 is a flowchart illustrating a power-on reset (POR) process according to various example embodiments.

FIG. 7 is a flowchart illustrating a power-on reset (POR) process according to various embodiments.

In an embodiment, each PBA may transmit a signal for connection to a third resistance value (e.g. 523 KΩ) among an identification resistance value included in the eighth terminal (e.g., the eighth terminal (pin 8) of FIG. 4) of the interface 110, in response to the storing of the binary data in the nonvolatile memory 230 according to the operation 509 described above. In an embodiment, in case of transmitting the signal for connection to the third resistance value to the eighth terminal (pin), each PBA may perform the POR process.

According to an embodiment, in operation 701, each PBA may reset power of the printed circuit board 100 in the printed circuit board 100 including the plurality of PBAs 120.

In an embodiment, the processor 210 included in each PBA may turn off power of the printed circuit board 100 and then turn on the same. In an embodiment, in case of turning off power of the printed circuit board 100, boot-loader data stored in the volatile memory 220 may be removed from the volatile memory 220.

According to an embodiment, in operation 703, each PBA may transmit a designated signal to the external device 300 through the interface 110 in the printed circuit board 100 including the plurality of PBAs 120.

In an embodiment, the processor 210 may perform a communication connection with the external device 300 through the interface 110.

In an embodiment, the designated signal transmitted to the external device 300 through the interface 110 may include a signal requesting determination about whether the printed circuit board 100 is normally booted.

According to an embodiment, the external device 300 may determine whether the printed circuit board 100 is normally booted, in case of receiving the designated signal from the printed circuit board 100.

In an embodiment, the external device 300 may transmit a first signal to the printed circuit board 100 in case that it is determined that the printed circuit board 100 is normally booted.

In an embodiment, the external device 300 may determine that the printed circuit board 100 is abnormally booted when an error with respect to binary data stored in the nonvolatile memory 230 of each PBA occurs. Otherwise, the external device 300 may determine that the printed circuit board 100 is abnormally booted when a lock-up occurs in a process of booting of the printed circuit board 100. The external device 300 may transmit a second signal distinguished from the first signal to the printed circuit board 100 in case that the printed circuit board 100 is abnormally booted.

According to an embodiment, in operation 705, each PBA may receive a response signal with respect to the designated signal from the external device 300 in the printed circuit board 100 including the plurality of PBAs 120.

According to an embodiment, in operation 707, each PBA may determine whether the printed circuit board 100 is normally booted based on the response signal with respect to the designated signal in the printed circuit board 100 including the plurality of PBAs 120.

In an embodiment, it may be determined that the printed circuit board 100 is normally booted in case that the printed circuit board 100 receives the first signal from the external device 300.

In an embodiment, it may be determined that the printed circuit board 100 is abnormally booted in case that the printed circuit board 100 receives the second signal from the external device 300.

Figure 8:
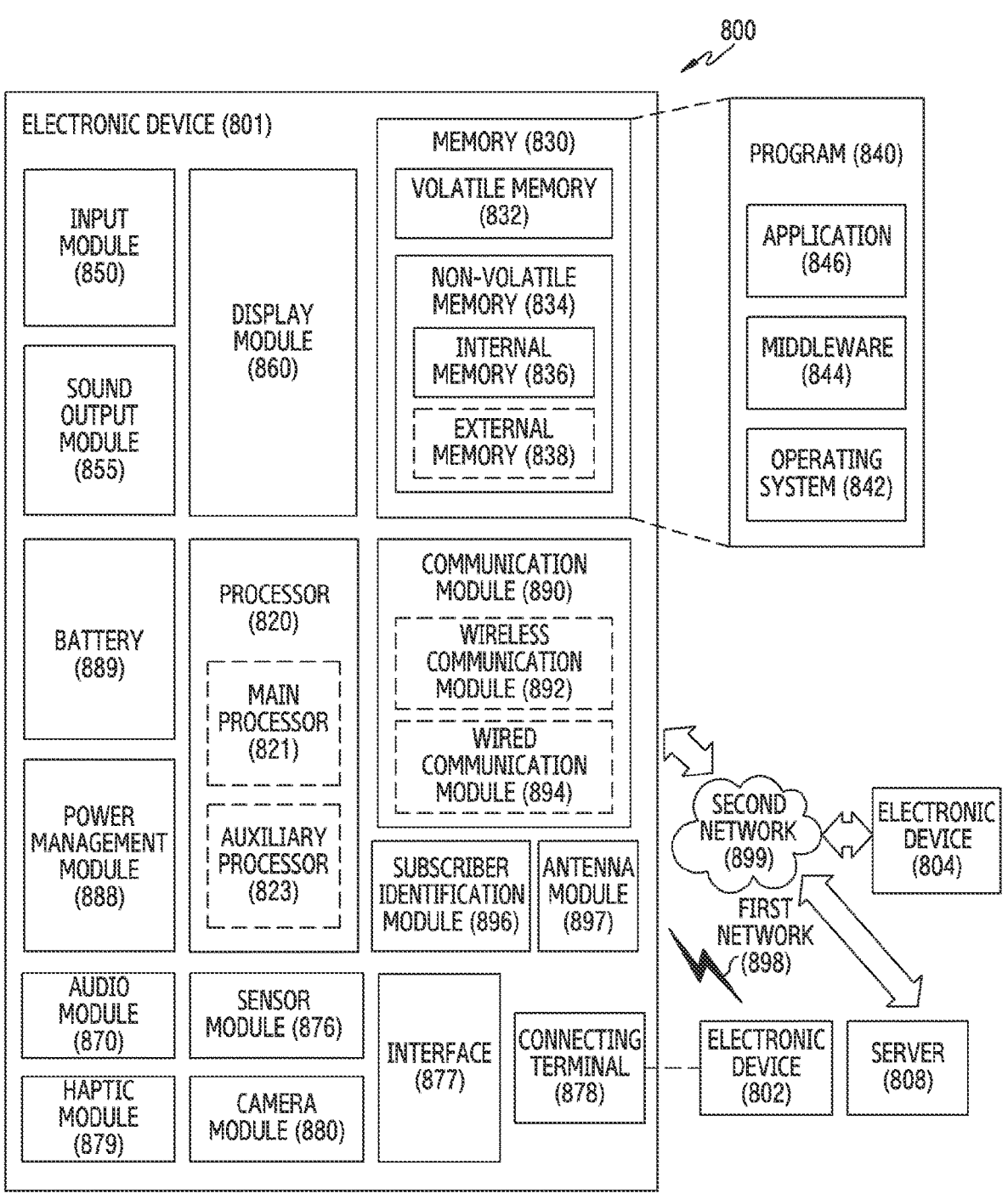
FIG. 8 is a block diagram of an electronic device within a network environment according to various example embodiments.

FIG. 8 is a block diagram of an electronic device within a network environment according to various embodiments.

Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to an embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860 comprising a display, the sensor module 876 comprising a sensor, and/or the communication module 890 comprising communication circuitry) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the displays, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to an embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A printed circuit board including a plurality of printed board assemblies (PBAs) and an interface configured to connect the plurality of PBAs and an external device, wherein the interface includes terminals having an N*M array, and terminals having an N*K array among the terminals having the N*M array are electrically connected, directly or indirectly, to each PBA included in the plurality of PBAs, wherein the each PBA includes a volatile memory, a nonvolatile memory, and a processor, and wherein the each PBA is configured to: in case that power is supplied from a first terminal among the terminals having the N*K array, transmit a first parameter signal to a second terminal among the terminals having the N*K array; in response to the transmission of the first parameter signal, store boot-loader data received from the external device in the volatile memory; in response to the storing of the boot-loader data, transmit a second parameter signal to a third terminal among the terminals having the N*K array; and in response to the transmission of the second parameter signal, store binary data received from the external device in the nonvolatile memory.

The binary data according to an embodiment may include a boot-loader data.

The volatile memory according to an embodiment may include a random access memory (RAM) and the nonvolatile memory may include at least one of a read only memory (ROM) and a NAND flash memory.

The processor according to an embodiment may determine whether the volatile memory and the nonvolatile memory are normally mounted in the each PBA, based on data with respect to a current flowing through the printed circuit board.

The processor according to an embodiment may perform a power-on reset (POR) with respect to the printed circuit board in response to the storing of the binary data in the nonvolatile memory.

The processor according to an embodiment may reset power of the printed circuit board in response to the storing of the binary data in the nonvolatile memory, transmit a designated signal to the external device through the interface, receive a response signal with respect to the designated signal from the external device in response to the transmission of the designated signal, and determine whether the printed circuit board is normally booted based on the response signal with respect to the designated signal.

The processor according to an embodiment may, in response to the storing of the binary data in the nonvolatile memory, store a basic application related to an operating system and a file system related to the operating system, in the nonvolatile memory through the binary data.

The processor according to an embodiment may, in response to the power supply from the first terminal: activate a communication terminal of the interface; receive a connection signal indicating connection between the printed circuit board and a modem port of the external device from the external device; and transmit the first parameter signal to the second terminal in response to the reception of the connection signal.

The processor according to an embodiment may, in response to the storing of the boot-loader data in the volatile memory, receive a string signal and a connection signal indicating connection between the printed circuit board and a modem port of the external device, from the external device, and in response to the reception of the string signal and the connection signal, transmit the second parameter signal to the third terminal.

The volatile memory according to an embodiment may be disposed on the processor.

The volatile memory and the nonvolatile memory according to an embodiment may include a blank memory in which data is not stored.

The printed circuit board according to an embodiment may include a first surface and a second surface opposite to the first surface, the interface and the nonvolatile memory may be disposed on, directly or indirectly, the first surface and the volatile memory and the processor may be disposed on, directly or indirectly, the second surface.

The processor according to an embodiment may include an application processor (AP).

The printed circuit board according to an embodiment may include a mounting area and a non-mounting area excluding the mounting area and the plurality of PBAs may be disposed on, directly or indirectly, the mounting area and the interface may be disposed on, directly or indirectly, the non-mounting area.

According to an embodiment, each of N and M may include an integer larger than 1, and N may include an integer smaller than M.

According to an embodiment, an N*M array may include a 3*14 array and an N*K array may include a 3*3 array.

According to various embodiments, in a printed circuit board including a plurality of PBAs and an interface configured to connect an external device with the plurality of PBAs, a data processing method with respect to a volatile memory and a nonvolatile memory disposed in each PBA included in the plurality of PBAs may include: in case that power is supplied from a first terminal of the interface, transmitting a first parameter signal to at least one second terminal of the interface; storing boot-loader data received from the external device in the volatile memory in response to the transmission of the first parameter signal; transmitting a second parameter signal to a third terminal of the interface in response to the storing of the boot-loader data; and storing binary data received from the external device in the non-volatile memory in response to the transmission of the second parameter signal, wherein the interface may include terminals having an N*M array, and the terminals having an N*K array among the terminals having the N*M array may be electrically connected, directly or indirectly, to the each PBA included in the plurality of PBAs.

The binary data according to an embodiment may include a boot-loader data.

According to an embodiment, the method may include transmitting a third parameter signal to the at least one second terminal in response to the storing of the binary data in the nonvolatile memory, receiving a response signal with respect to the third parameter signal through the external device in response to the transmission of the third parameter signal, and determining whether the printed circuit board is normally booted based on the response signal with respect to the third parameter signal. "Based on" as used herein covers based at least on.

According to an embodiment, the method may include, in response to the storing of the binary data in the nonvolatile memory, storing a basic application related to an operation system and a file system related to the operating system, in the nonvolatile memory through the binary data.

According to various embodiments, a printed circuit board including a plurality of PBAs may include an interface configured to connect the plurality of PBAs and an external device, a volatile memory, a nonvolatile memory, and a processor included in each PBA included in the plurality of PBAs, wherein the each PBA may transmit a first parameter signal to at least one second terminal of the interface to which power is supplied from a first terminal of the interface, store boot-loader data received from the external device in the volatile memory in response to the transmission of the first parameter signal, transmit a second parameter signal to a third terminal of the interface in response to the storing of the boot-loader data, and store binary data received from the external device in the nonvolatile memory in response to the transmission of the second parameter signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A printed circuit board comprising:
a plurality of printed board assemblies (PBAs), and an interface configured to connect the plurality of PBAs to an external device,
wherein the interface comprises terminals having an N*M array, wherein terminals having an N*K array among the terminals having the N*M array are electrically connected to each PBA included in the plurality of PBAs, wherein each of N, M, and K is a positive integer,
wherein the each PBA comprises a volatile memory, a nonvolatile memory, and at least one processor comprising processing circuitry, and
wherein each of the PBAs is configured to:
in a case that power is supplied from a first terminal among the terminals having the N*K array, transmit a first parameter signal to a second terminal among the terminals having the N*K array;
in response to the transmission of the first parameter signal, store boot-loader data received from the external device in the volatile memory;
in response to the storing of the boot-loader data, transmit a second parameter signal to a third terminal among the terminals having the N*K array; and
in response to the transmission of the second parameter signal, store binary data received from the external device in the nonvolatile memory.

2. The printed circuit board of claim 1, wherein the processor is configured to determine whether the volatile memory and the nonvolatile memory are normally mounted in the each PBA, based on data with respect to current flowing through the printed circuit board.

3. The printed circuit board of claim 1, wherein the processor is configured to perform a power-on reset (POR) with respect to the printed circuit board in response to the storing of the binary data in the nonvolatile memory.

4. The printed circuit board of claim 1, wherein the processor is configured to:
reset power of the printed circuit board in response to the storing of the binary data in the nonvolatile memory;
control to transmit a designated signal to the external device through the interface;
receive a response signal with respect to the designated signal from the external device in response to the transmission of the designated signal; and
determine whether the printed circuit board is normally booted based on the response signal with respect to the designated signal.

5. The printed circuit board of claim 1, wherein the processor is configured to, in response to the storing of the binary data in the nonvolatile memory, store a basic application related to an operating system and a file system related to the operating system, in the nonvolatile memory through the binary data.

6. The printed circuit board of claim 1, wherein the processor is configured to, in response to the power supply from the first terminal:
activate a communication terminal of the interface;
receive a connection signal indicating connection between the printed circuit board and a modem port of the external device from the external device; and
control to transmit the first parameter signal to the second terminal in response to the reception of the connection signal.

7. The printed circuit board of claim 1, wherein the processor is configured to:

in response to the storing of the boot-loader data in the volatile memory, receive a string signal and a connection signal indicating connection between the printed circuit board and a modem port of the external device, from the external device; and in response to the reception of the string signal and the connection signal, control to transmit the second parameter signal to the third terminal.

8. The printed circuit board of claim 1, wherein the volatile memory and the nonvolatile memory comprise a blank memory in which data is not stored.

9. The printed circuit board of claim 1, wherein the printed circuit board comprises a first surface and a second surface opposite to the first surface, wherein the interface and the nonvolatile memory are disposed on the first surface, and the volatile memory and the processor are disposed on the second surface.

10. The printed circuit board of claim 1, wherein the printed circuit board comprises a mounting area and a non-mounting area excluding the mounting area, and the plurality of PBAs are disposed on the mounting area and the interface is disposed on the non-mounting area.

11. The printed circuit board of claim 1, wherein N is an integer smaller than M, and K is an integer smaller than M.

12. The printed circuit board of claim 1, wherein the binary data includes the boot-loader data.

13. The printed circuit board of claim 1, wherein the volatile memory includes a random access memory (RAM), and the nonvolatile memory includes at least one of a read only memory (ROM) or a NAND flash memory.

14. The printed circuit board of claim 1, wherein the processor includes an application processor (AP).

15. The printed circuit board of claim 1, wherein the N*M array includes a 3*14 array, and the N*K array includes a 3*3 array.

16. A data processing method for a volatile memory and a nonvolatile memory disposed in each printed board assembly (PBA) included in a plurality of PBAs in a printed circuit board comprising the plurality of PBAs and an interface configured to connect an external device with the plurality of PBAs, the method comprising:

in a case that power is supplied from a first terminal of the interface, transmitting a first parameter signal to at least one second terminal of the interface;

storing boot-loader data received from the external device in the volatile memory in response to the transmission of the first parameter signal;

transmitting a second parameter signal to a third terminal of the interface in response to the storing of the boot-loader data; and storing binary data received from the external device in the nonvolatile memory in response to the transmission of the second parameter signal, wherein the interface comprises terminals having an N*M array, wherein terminals having an N*K array among the terminals having the N*M array are electrically connected to each PBA included in the plurality of PBAs, wherein each of N, M, and K is a positive integer.

17. The method of claim 16, comprising:

transmitting a third parameter signal to the at least one second terminal in response to the storing of the binary data in the nonvolatile memory;

receiving a response signal with respect to the third parameter signal through the external device in response to the transmission of the third parameter signal; and determining whether the printed circuit board is normally booted based on the response signal with respect to the third parameter signal.

18. The method of claim 16, comprising, in response to the storing of the binary data in the nonvolatile memory, storing a basic application related to an operation system and a file system related to the operating system, in the nonvolatile memory through the binary data.

19. The method of claim 16, wherein the binary data includes the boot-loader data.

20. A printed circuit board comprising a plurality of printed board assemblies (PBAs), the printed circuit board comprising:

an interface, comprising terminals having an array, configured to connect the plurality of PBAs to an external device; and a volatile memory, a nonvolatile memory, and a processor included in each PBA included in the plurality of PBAs, wherein each of the PBAs is configured to:

transmit a first parameter signal to at least one corresponding second terminal among the terminals having the array, to which power is supplied from a corresponding first terminal among the terminals having the array;

store boot-loader data received from the external device in the volatile memory in response to the transmission of the first parameter signal;

transmit a second parameter signal to a corresponding third terminal among the terminals having the array in response to the storing of the boot-loader data; and store binary data received from the external device in the nonvolatile memory in response to the transmission of the second parameter signal.

* * * * *